March 26, 1940. W. C. BUTTNER 2,194,541
CYLINDER VALVE
Filed March 11, 1938 2 Sheets-Sheet 1

Inventor
William C. Buttner
by Parker & Carter
Attorneys.

March 26, 1940.   W. C. BUTTNER   2,194,541
CYLINDER VALVE
Filed March 11, 1938   2 Sheets—Sheet 2
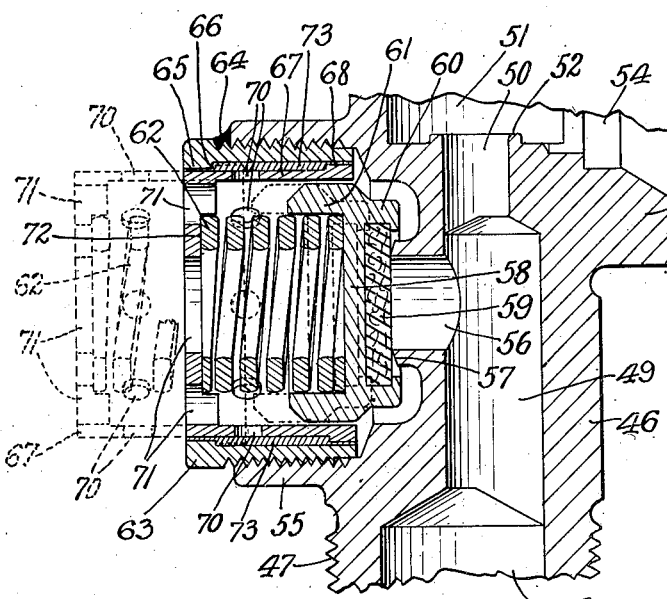
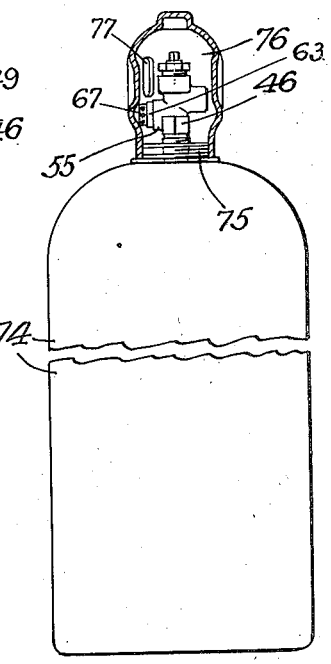
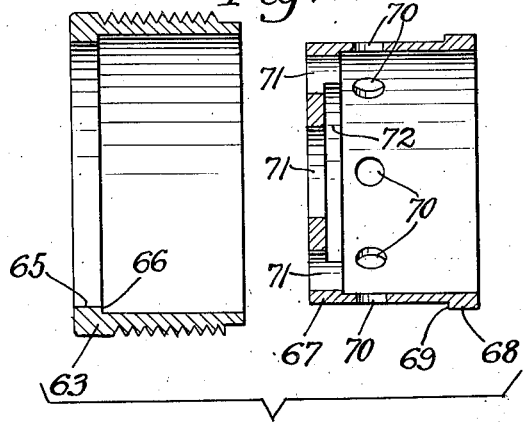
Inventor
William C. Buttner
by Parker & Carter
Attorneys.

Patented Mar. 26, 1940

2,194,541

UNITED STATES PATENT OFFICE 2,194,541

CYLINDER VALVE

William C. Buttner, Winnetka, Ill., assignor to The Bastian-Blessing Co., Chicago, Ill., a corporation of Illinois Application March 11, 1938, Serial No. 195,273

11 Claims. (Cl. 137—53)

This invention relates to a valve construction and particularly to a safety valve mechanism. In the present embodiment it is particularly adaptable to use in connection with tanks, bottles and other containers for gas, in connection with which it is desirable to provide a safety arrangement which will operate in case of extreme heat to permit venting of the gas and to prevent explosion or other rupture of the container. The application of the device of the present invention is not limited to that use.

One object of the invention is, therefore, to provide a safety valve mechanism which will operate automatically and certainly upon the occurrence of sufficient heat to make venting or discharge of the material in the container to which the valve is applied, desirable.

Another object of the invention is to provide in connection with the safety valve assembly, heat responsive means for causing the assembly to be disassembled.

Another object is to provide a heat responsive means or construction which acts automatically upon the occurrence of sufficient heat and before dangerous over-heating has occurred to insure the automatic venting or discharge of material from the container to which the assembly is applied.

Other objects will appear from time to time throughout the specification and claims.

The invention is illustrated more or less diagrammatically in the accompanying drawings wherein like parts are designated by like characters throughout.

Figure 3 is a fragmentary sectional view illustrating a modified form.

Figure 4 is a view in section showing the cap and insert of Figure 3 removed and separated.

Figure 5 is a side elevation with parts in section and parts broken away illustrating one use of the valve in connection with a cylinder of gas.

Figure 1 is a valve body which may be exteriorly threaded as at 2 and is provided with an interior passage 3. This passage may be reduced as at 4 and may carry at its inner end a valve seat portion 5.

Figure 1:
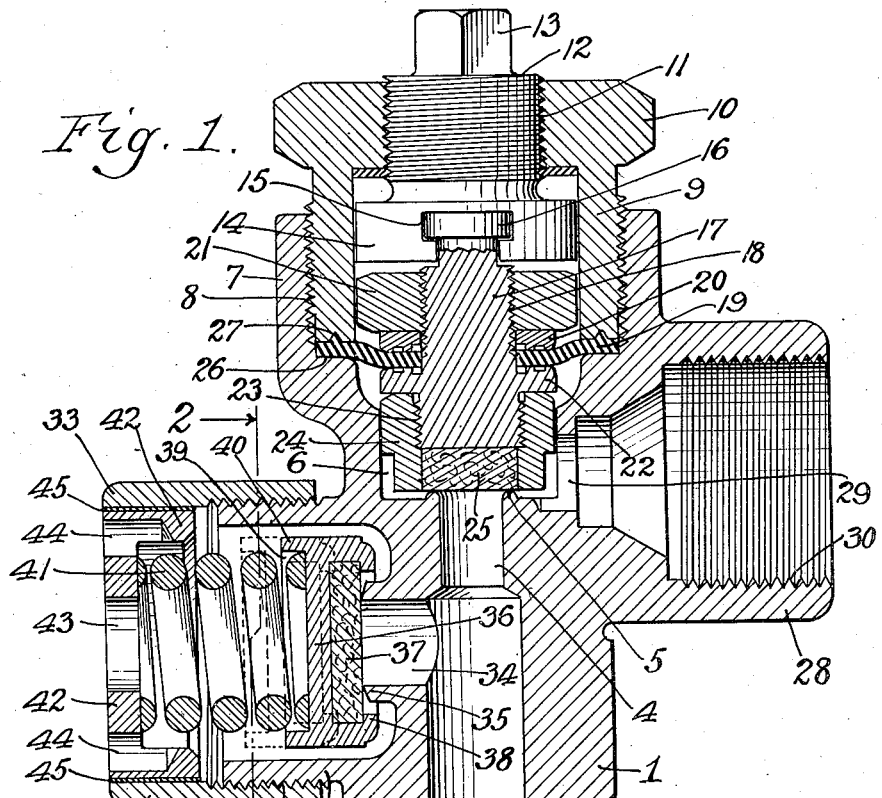
Figure 1 is a longitudinal cross section view of the device.

The passage 3 either directly or by means of the reduced passage 4 communicates with an enlarged space or chamber 6 formed within the valve housing and extending into an enlarged portion 7 of the housing. The portion 7 may be interiorly threaded as at 8 to receive a correspondingly threaded hollow nut 9, which as shown, comprises a generally annular portion and may be enlarged as at 10. The portion 10 is preferably given an angular cross section so that it may be readily engaged by a tool by means of which it is seated or removed when desired. The portion 10 is also provided with a threaded perforation 11 in which a threaded plug 12 is seated. This plug is preferably provided with a reduced portion 13, shaped to receive a tool by means of which it is moved. On its inner end the member 12 is enlarged as at 14 and provided with a pocket 15 in which the enlarged end or head 16 of a connector 17 is received and by means of which the connector may be lifted or lowered. The connector is preferably threaded as at 18 and passes through a perforation in a diaphragm 19. A packing member 20 is positioned about the threaded portion 18 of the connector 17 and at one side bears against the nut 21 and at the other against the diaphragm 19. The connector is also preferably provided with a laterally extending flange 22 which on its outer face bears against the diaphragm 19. Inwardly of the flange 22, the connector is threaded as at 23 to receive a correspondingly threaded hollow seat retaining nut 24. This nut bears against one face of the flange 22 and contains and supports a face portion 25 which may be of any desirable material, and which, when the valve is closed, is in sealing contact with the seat portion 5.

The diaphragm 19 is seated on its inner edge, upon a shoulder 26 formed in the enlargement 7 of the valve housing and lying generally within the chamber 6. On its outer edge, the diaphragm 19 is in contact with the inner face of the annular portion of the nut 9. The inner face of this annular portion may be provided with a groove 27 or may otherwise be so shaped that when the nut is screwed into position, its inner face makes a sealing contact with the diaphragm. The diaphragm is thus held in place at its edges and sealed against leakage by the nut 9.

A lateral enlargement 28 is preferably formed integrally with the housing 1 and is provided with the passage 29 which communicates with the chamber within the housing. This passage may be of any desired shape and may be interiorly threaded as at 30 in order that it may be connected to a pipe or other means of receiving material which may flow through it.

The housing section 1 is preferably provided with an integral connecting portion 31 which for convenience is herewith shown as oppositely placed with respect to the member 28, but which might be otherwise positioned. It is preferably interiorly threaded as at 32 to receive a hollow more or less cylindrical cap 33 which is correspondingly threaded and is thus engaged with the member 31 as shown. A passage 34 leads from the passage 3 of the valve body 1 to the interior of the connector 31. A seat portion 35 may be formed at the outer end of the passage 34 and upon it is seated a head, member 36, which carries on its inner face a face portion 37. The member 36 is provided with a depression within which the seat portion 37 is seated and may have inwardly bent edges 38 to retain the seat portion in place. A depression or pocket 39 is formed in the opposite face of the member 36 and is bounded by an annular flange 40. Within this pocket 39 is positioned one end of a compression spring 41, the opposite end of which is seated against the inner face of a cap insert 42, which may be perforated as at 43 and 44. This cap insert is held in place within the cap 33 by fusible metal 45. As shown this metal lies generally in an annulus about the insert 42 and between its outer edge and the inner surface of the cap 33 and when in a solid state it holds the cap and the insert together as a unit and maintains the spring 41 under proper compression. When melted it can no longer hold the insert in place and the latter is thereupon forced out of position by the spring which is thus freed from compression and the member 36 with the face 37 is then free to be unseated by fluid within the passage 3. The modified form of Figures 3 and 4 is generally the same as that shown in the earlier figures but differs from it mainly in the fact that the member which retains the insert is itself positioned within a portion of the valve housing and by the further fact that perforations are formed in the insert not only in its outer end but in its sides, and by the further fact that the passage through the valve housing is displaced laterally to permit a saving of space for the safety valve assembly. Thus the valve, when positioned in a crowded space, may still move to the open position even though the smallest size of the commonly supplied protection caps shown in Figure 5, is used, and consequently without causing closing of any of the escape holes formed within it.

As shown in Figure 3, 46 is a housing more or less similar to the housing 1 exteriorly threaded as at 47 and provided with a passage or hollow 48 which communicates with a laterally displaced portion 49. A service opening or passage 50 leads from the space 49 into a cavity 51 within which the service valve mechanism is positioned. This valve mechanism may be generally the same as that shown in Figure 1 and is, therefore, not repeated in Figure 3. A valve seat 52 is preferably formed about the upper end of the passage 50 and the housing member is provided with a lateral extension 53 having a passage or space 54 generally similar to the space 29 in the form of Figure 1, which may receive a service or outlet connection.

Preferably formed integrally with the housing 46 is a hollow interiorly threaded portion 55 which communicates with the laterally offset cavity 49 by means of a passage 56 which at its outer or discharge end may have a valve seat 57. A member 58 carries on one face a seating portion 59 which is preferably held in place by an annular flange 60. A flange 61 formed on the opposite face of the member 58 provides a seating and spacing socket for one end of a spring 62.

An insert retainer 63 which is hollow and exteriorly threaded engages the corresponding threading on the interior of the member 55. After being screwed into the proper position, it may be held in place by solder 64 although this is not an essential feature of the invention. The member 63 on the face outer end is provided with a flange 65 which forms a shoulder 66.

Positioned within the retainer 63 is a cap insert 67. This member is hollow and is provided with an external flange 68 which may be positioned adjacent its inner end and which provides a shoulder 69. The insert may be provided in its side walls with perforations 70 and in its end wall with additional perforations 71. Its end wall is so shaped as to provide a socket like portion 72 in which the outer end of the spring 62 is seated as shown particularly in Figure 3. In Figure 1 the spring is formed of rounded wire while in Figure 3 it is formed of flattened wire. The spring may be of any desired shape or construction.

When the insert and retainer are initially put into use they are telescoped or collapsed together in the position shown in Figure 3 and the space between them is filled with fusible metal 73.

As shown in Figure 5, a cylinder 74 is provided with a closure 75 and a valve assembly, such as that shown herewith, is applied to it. The particular valve assembly shown is that of Figures 3 and 4 and it is shown in the opened position in which the insert has been forced to its full outer position of the dotted lines of Figure 3. In this position it is clear that the insert has not come up against the cap 76 which covers and protects the valve and thus the holes 71 of the insert have not been closed. Escape of fluid from the interior of the cap 76 is permitted by the openings 77 in the cap.

Although I have shown and described an operative form of my device, it is obvious that many changes in the form, shape and arrangement of parts may be made without departing from the spirit of my invention and I wish, therefore, that my showing be taken as in a sense diagrammatic.

The use and operation of my invention are as follows:

The valve assembly shown herewith is seated in an opening in a container which contains fluid. As mentioned above, one use is in connection with a tank of gas, which may be present as a liquid or as gas, or as both. If the pressure of the fluid within the container is not excessive, the face member 37 remains seated. When the fluid is not to be disturbed, the face member 25 supported by the member 17 is also held seated. When gas is to be discharged, the connector 28 will ordinarily be connected to a pipe or to other means for conducting the fluid to a point of use or to a point of storage and when that connection is complete, the valve may be opened. This is accomplished by rotating the member 12, which is backed off and which, since it engages the head 16 of the member 17, which latter carries the face portion 25, raises the face portion from the seat 5 and permits discharge of fluid from the container.

In use it sometimes occurs that tanks of the sort to which the apparatus of the present invention may be applied, are subjected to excessive heat when, for example, a fire occurs when they are stored or in use. It would appear that when this occurs, the safety valve would be sufficient to vent the gas and to prevent explosion of or damage to the container because, as indicated in dotted lines in Figure 1, the face member 37 which is held in place by the spring 41 may be unseated by yielding of the spring upon the occurrence of excessive pressure within the container. Experience has shown that this does not always occur and that containers equipped with safety valves may still explode when heated excessively. Where such containers are used to contain liquid gas, this may all be vaporized and much of it will be discharged through the safety valve. After the gas has been completely vaporized, the safety valve may close again at pressures, for example, in the neighborhood of 300 or 400 lbs., which for many installations is a normal relief pressure. When this occurs, a substantial quantity of gas still remains in the container. If the fire continues, the container may be heated further and the accumulated or retained pressure may be sufficient to cause the metal to yield; to become distorted; or actually to burst.

It is one of the objects of the present invention to prevent the occurrence of the conditions outlined above. In the first stages of a fire, when pressure is sufficient, the safety valve will be unseated and much of the gas will be vented. If now after all of the gas has been vaporized, the pressure within the container is no longer sufficient to keep the valve open, it will be reseated. If, for example, the container is filled with propane, the valve spring may be set to permit opening of the safety valve at pressures between 375 lbs. and 400 lbs. per square inch. Pressures of this sort may be attained without excessive temperatures and the vapor pressure of propane would be over 500 lbs. per square inch with a temperature of but 180° F., and if a fusible metal, having a melting point of 212° F. were used, this temperature would not fuse it and the valve parts would remain assembled. The pressure of 500 lbs. may occur at the temperature indicated, this temperature penetrating the shell of the container and tending to vaporize the liquid and thus the safety valve, being forced open, would permit the gas to escape more or less continuously, providing the heating was substantially constant, and there would be a continuous cooling effect on the soldered joints where the fused metal is located. These conditions would prevail until all or the greater part of the liquid is vaporized or boiled away. After all the liquid is vaporized, if heating continues, the safety valve would discharge an amount of gas equivalent to whatever expansion occurs, but it would still tend to close at a pressure of approximately 400 lbs. in the cylinder. As the rapid discharge of the relatively cool gas is diminished or terminated, when all of the gas has been vaporized in the container, the cooling effect of its discharge upon the fuse metal is reduced or entirely terminated and the heat from the fire then raises the temperature of the fuse metal to its melting point. When it melts, the cap insert 42 is ejected by the expansion of the spring 41 and the face member 37, if it is previously closed, re-opens and if it is not previously closed, remains permanently open, thus permitting the discharge of the gas remaining until its pressure is reduced, to the equivalent of atmospheric pressure.

From the above description of the device, it is clear that it avoids the possibility of explosion of or damage to the container and this arrangement of a fusibly mounted safety valve, makes adequate provision for a safety valve which will at all times respond to excessive pressures and which in addition will open surely and adequately at the right time when excessive heat occurs.

Figure 2:
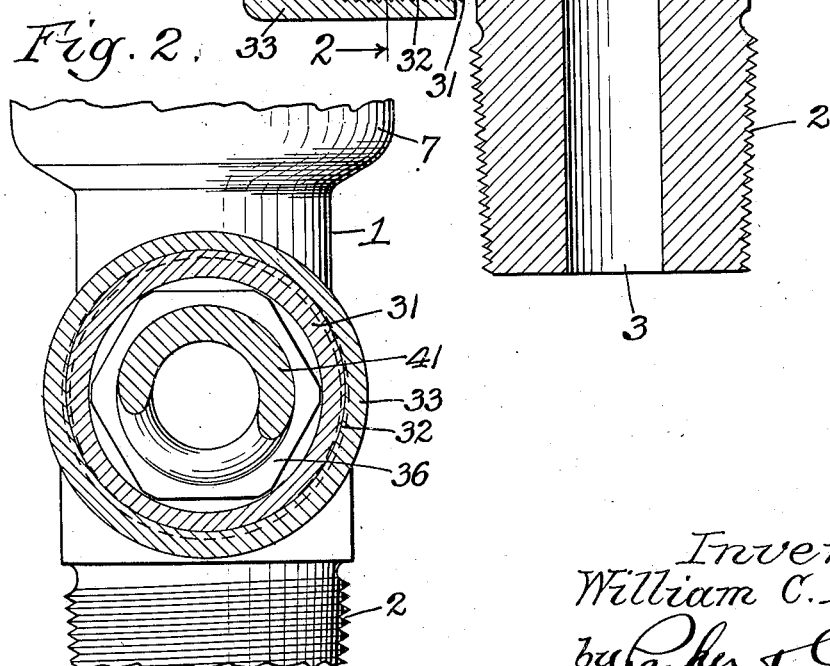
Figure 2 is a transverse sectional detail taken at line 2—2 of Figure 1.

The form shown in Figures 3, 4 and 5 operates in much the same manner as that described above for the form of Figures 1 and 2. By reason of the lateral displacement of the passage 49 and by reason of the fact that the retainer 63 is positioned within the member 55, a considerable saving in space for the total installation is accomplished. With the parts as shown in Figure 3, if temperature conditions do not rise dangerously high, the valve will function as an ordinary safety valve, the spring 62 yielding under the excessive pressure to permit discharge of fluid within the container to which the valve assembly is secured so long as excess pressure conditions continue. When pressure has been relieved the valve is reseated by the spring.

When temperature conditions become such as to be dangerous, the fusible metal 73 fuses or melts or softens to the point at which it can no longer hold the insert and retainer against the compression of the spring 62 or against the pressure within the valve housing, and under the influence of one or both of these pressures the insert moves with respect to the retainer to the dotted line position of Figure 3. The design of the spring is such that when the parts have moved to this dotted line position, the spring is no longer sufficient to hold the valve seated against pressure and the valve is thus unseated and the container may be emptied. When the insert moves to the position of Figure 3, the shoulder 69 strikes the shoulder 66 and further outward movement of the insert is impossible. Thus there is no danger that the insert and any of the other parts will be violently driven or projected outward away from the valve assembly so as to cause any damage. Also since the insert is provided with perforations in its side, even if its outer end should contact some obstacle when in the dotted line position, it will not be sealed or closed because escape will occur through the side perforation 70 even if the end perforations 71 are closed.

I claim:

1. In combination in a safety valve assembly, a housing, a passage therethrough, a hollow safety valve receiving portion, a passage from the interior of said housing to said receiving portion, a safety valve within said valve receiving portion normally closing said latter passage, a yielding member adapted to hold said valve closed and to yield at pre-determined pressure, a hollow retainer, about said valve, a projection on said retainer, an insert within said retainer, a projection thereon, adapted to contact the projection on said retainer, the outward movement of the insert being limited by the contact of said projections, the said yielding means bearing against said insert, and fusible metal between the insert and retainer adapted when unfused to hold the parts against relative movement with the projections spaced apart and when fused, to free them for outward movement of said insert.

2. In combination in a safety valve assembly, a housing, a passage therethrough, said passage being laterally displaced in a portion of its length away from the central axis of the housing, a safety valve receiving cavity portion positioned generally opposite said lateral displaced portion, a passage from the interior of said housing to said valve receiving portion, a safety valve within said valve receiving portion normally closing said latter passage, a yielding member adapted to hold said valve closed and to yield at predetermined pressure, a hollow retainer positioned within said cavity, a projection on said retainer, an insert within said retainer, a projection thereon, adapted to contact the projection on said retainer, the outward movement of the insert being limited by the contact of said projections, the said yielding means acting against said insert, said insert being perforated in its sides, and fusible metal between the insert and retainer adapted when unfused to hold the parts against relative movement with the projections spaced apart and when fused, to free them for outward movement of said insert.

3. In combination in a safety valve assembly, a housing, a passage therethrough, a hollow safety valve receiving portion, a passage from the interior of said housing to said receiving portion, a safety valve within said valve receiving portion normally closing said latter passage, a yielding member adapted to hold said valve closed and to yield at predetermined pressure, a hollow retainer positioned within said cavity, an interior projection on said retainer, an insert within said retainer, an external projection thereon, adapted to contact the projection on said retainer, the outward movement of the insert being limited by the contact of said projection, the said yielding means contacting said insert, said insert perforated in its sides and in its ends, and fusible metal between the insert and retainer adapted when unfused to hold the parts against relative movement with the projections spaced apart and when fused, to free them for outward movement of said insert.

4. In combination in a safety valve assembly, a housing, a generally axial passage therethrough, said passage being laterally displaced in a portion of its length away from the central axis of the housing, a hollow safety valve receiving portion positioned generally opposite said lateral displaced portion, a passage from the interior of said housing to said receiving portion, a safety valve within said valve receiving portion normally closing said latter passage, a yielding spring member adapted to hold said valve closed and to yield at pre-determined pressure, a hollow retainer positioned within said cavity, an interior projection on said retainer, an insert within said retainer, an external projection thereon, adapted to contact the projection on said retainer, the outward movement of the insert being limited by the contact of said projections, the said yielding spring means acting against insert, said insert perforated in its sides, and fusible metal between the insert and retainer adapted when unfused to hold the parts against relative movement with the projections spaced apart and when fused, to free them for outward movement of said insert.

5 In combination in a safety valve assembly, a housing, a passage therethrough, an integral hollow safety valve receiving portion, a passage from the interior of said housing to said receiving portion, a safety valve within said valve receiving portion normally closing said latter passage, a yielding spring member adapted to hold said valve closed and to yield at pre-determined pressure, a hollow retainer positioned about said safety valve, a projection on said retainer, an insert within said retainer, a projection thereon, adapted to contact the projection on said retainer, the outward movement of the insert being limited by the contact of said projection, the said yielding spring means acting against said insert, said insert perforated in its sides and in its ends, and fusible metal between the insert and retainer adapted when unfused to hold the parts against relative movement with the projections spaced apart and when fused, to free them for outward movement of said insert.

6. In combination in a safety valve assembly, a housing, a generally axial passage therethrough, said passage being laterally displaced, in a portion of its length, away from the central axis of the housing, an integral hollow safety valve receiving portion positioned generally opposite said lateral displacement, a passage from the interior of said housing to said receiving portion, a safety valve within said valve receiving portion normally closing said latter passage, a yielding spring member adapted to hold said valve closed and to yield at pre-determined pressure, a hollow retainer positioned about said safety valve, a projection on said retainer, an insert within said retainer, a projection thereon, adapted to contact the projection on said retainer, the outward movement of the insert being limited by the contact of said projections, the said yielding spring means acting against said insert, said insert perforated in its sides and in its ends, and fusible metal between the insert and retainer adapted when unfused to hold the parts against relative movement with the projections spaced apart and when fused, to free them for outward movement of said insert.

7. In combination, a safety valve having a member defining a cavity and a valve seat, a safety valve positioned within said cavity, a retainer member and an abutment member within said cavity, a spring within said abutment member and bearing thereupon and upon said valve, fusible metal between the abutment member and the retainer member adapted when solid to prevent relative movement of said members, the outer face of the abutment member and the inner face of the retainer member shaped to permit limited relative movement of said members in the opening direction of said valve and to prevent complete separation of the members in that direction.

8. In combination, a safety valve having a member defining a cavity and a valve seat, a safety valve positioned within said cavity, a retainer member and an abutment member within said cavity, a spring within said abutment member and bearing thereupon and upon said valve, fusible metal between the abutment member and the retainer member adapted when solid to prevent relative movement of said members, a projection on the outer face of the abutment member and a corresponding projection on the inner face of the retainer member, the two projections adapted to contact upon relative movement of the members in one direction and to limit that movement.

9. In combination, a safety valve having a member defining a cavity and a valve seat, a safety valve positioned within said cavity, a retainer member and an abutment member within said cavity, a spring within said abutment member and bearing thereupon and upon said valve, fusible metal between the abutment member and the retainer member adapted when solid to prevent relative movement of said members, a shoulder on the outer face of the abutment member and a corresponding shoulder on the inner face of the retainer member, the two shoulders adapted to contact upon relative movement of the members in one direction and to limit that movement.

10. In combination in a safety valve assembly, a valve housing having a passage therethrough, a portion of said passage offset laterally from the axis of said passage, a safety valve cavity formed in said housing generally opposite said offset portion of the passage, a valve seat in said cavity, a safety valve, a yielding member tending normally to hold said valve seated, an abutment member against which said spring bears, said abutment member being provided with perforations in its end and in its sides, a retainer member positioned about said abutment member, the outer face of the abutment member and the inner face of the retainer member shaped to permit limited relative movement in the opening direction of said valve and to prevent complete separation of the parts in that direction.

11. In a safety valve, a housing defining within itself a main passage, a safety pressure release outlet passage communicating with said main passage, a safety valve positioned to close the safety outlet passage, means positioned to hold said valve seated and closed, and adapted to yield to excess pressures at normal temperatures, there being an abutment supporting member detachably supported by the housing, a perforated infusible abutment for said safety valve-holding means, said abutment member being secured to the abutment-supporting member by a mass of fusible metal, which metal is adapted to melt at a predetermined temperature, the said holding means being adapted, when the metal is melted, to force the abutment out of position and to free the safety valve for opening.

WILLIAM C. BUTTNER.